UNITED STATES PATENT OFFICE.

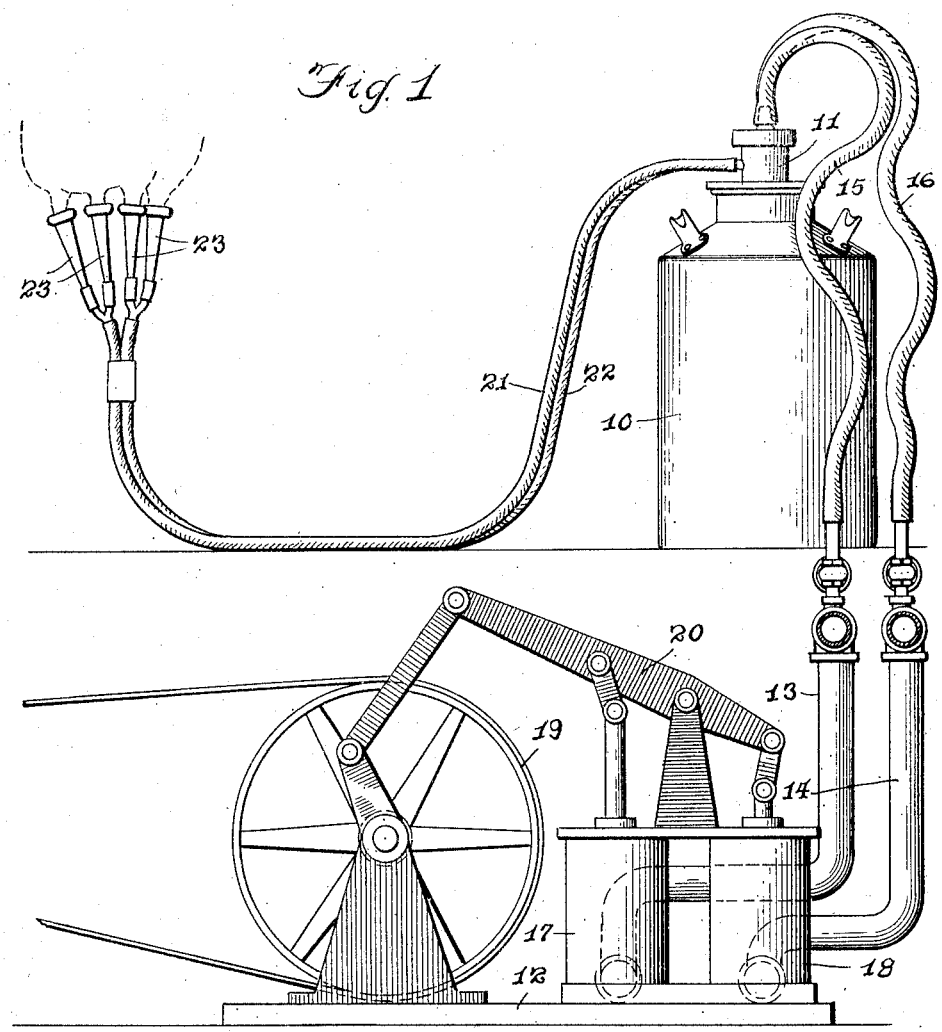

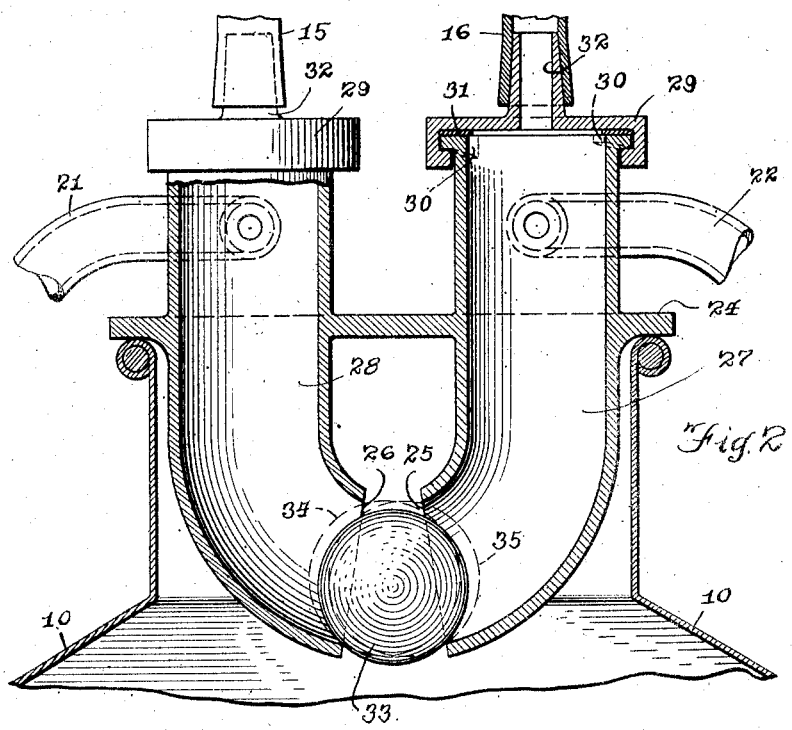

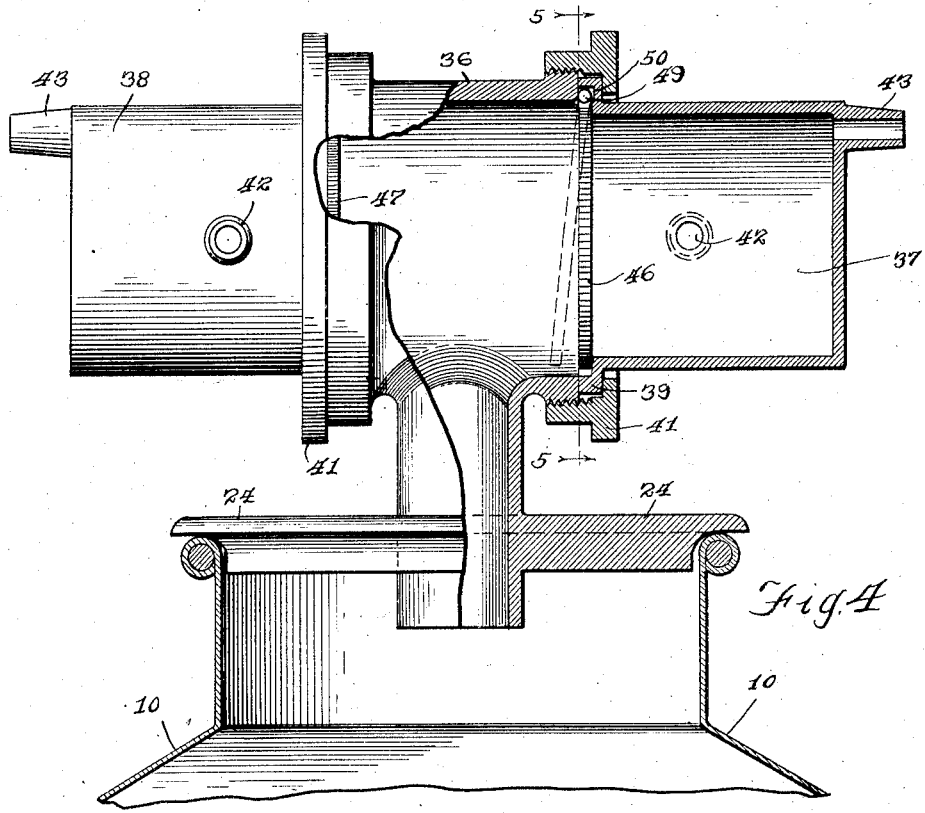
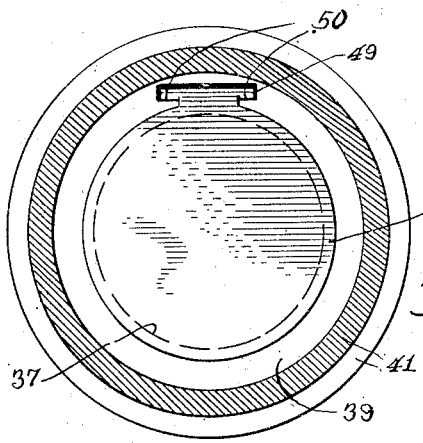
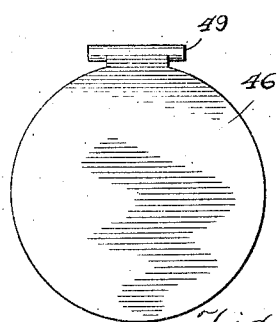

WILLIAM R. NICOLL, OF OWATONNA, MINNESOTA.

MILKING-MACHINE.

1,300,857.   Specification of Letters Patent.   Patented Apr. 15, 1919.

Application filed October 3, 1917. Serial No. 194,451.

*To all whom it may concern:*

Be it known that I, WILLIAM R. NICOLL, a citizen of the United States, residing at Owatonna, in the county of Steele and State of Minnesota, have invented certain new and useful Improvements in Milking-Machines, of which the following is a specification.

This invention has for its object the provision of a milking machine which shall be of improved construction and more efficient and convenient in operation than similar devices previously known. The invention is exemplified in the combination and arrangement of parts shown in the accompanying drawings and described in the following specification, and it is more particularly pointed out in the appended claims.

In the drawings—

Figure 1 is an elevational view showing somewhat diagrammatically the general arrangement of a milking machine embodying the present invention;

Fig. 2 is a vertical sectional view of one form of milker head included in the invention;

Fig. 3 is a vertical sectional view of a modified form of milker head;

Fig. 4 is an elevation, with parts in section, of still another modification;

Fig. 5 is a transverse section on line 5—5 of Fig. 4; and

Fig. 6 is a side elevation of a valve used in the modification shown in Fig. 4.

Referring first to Fig. 1 of the drawings, the numeral 10 designates a milk receptacle such as the ordinary form of milk-can, in the opening of which is fitted a milker head 11, the construction of which will be explained in connection with the other figures of the drawings. A double acting suction pump 12 is connected by any suitable means, such as pipes 13 and 14 and flexible hose 15 and 16, with the milker head 11. The form of pump shown in the drawing is provided with a pair of cylinders 17 and 18 which are connected respectively with the pipes 13 and 14 so that the air will be alternately exhausted from the two pipes. It is of course apparent that other forms of pumps may be used, such as a single cylinder with pipe connections at the opposite ends thereof, or any well-known and approved suction pump construction may be employed. In the form shown, the pump is operated by a power wheel 19 and lever 20. A pair of conduits 21 and 22 connect the milker head 11 with the cow's udder, and the milker head is so arranged that suction is produced in these conduits alternately. Each conduit is provided with a pair of teat cups 23 and by this arrangement the suction in one of the conduits or the other supports the cups in position at all times, the suction on the two pairs of cups being alternated by the arrangement of the milker head and the connection with the double acting pump.

Referring now to Fig. 2 of the drawing, the upper part of the can 10 is shown in section and the milker head is provided with a plate 24 which closes the upper end of the can and supports the milker head thereon. In the form shown in this figure, the milker head consists of an inverted U-shaped tube the legs of which pass through the plate 24, and the lower or connecting portion of which is cut away to form openings 25 and 26 in the lower ends of the two sections 27 and 28 respectively of the milker head. The upper ends of the milker head sections are closed by caps 29 provided with wedge-shaped lugs 30 for holding them firmly in place, a gasket 31 being also provided to form an air tight connection. The caps 29 are provided with nipples 32 over which the ends of the flexible conduits 15 and 16 fit. The conduits 21 and 22 are connected in a similar manner with the milker head sections at a point below the caps 29 but above the plate 24. A ball valve 33 is supported by the openings 25 and 26 at the lower ends of the milker head sections and is so proportioned that when it is free to respond to the action of gravity alone it will be supported in the position shown in the figure, leaving the openings 25 and 26 partially unobstructed. The valve 33 should be of light weight and may be a hollow rubber ball, hollow aluminum, or of other suitable construction.

In operation, the air is alternately partially exhausted from the two sections 27 and 28 by the action of the pump 12. Assuming that the partial vacuum is first produced in the conduit 15 and the milker head section 28, it will be seen that the ball valve 33 will be drawn by suction into the position shown by the broken line 34 in the drawing, and thus the section 28 will be closed from the atmosphere. The continued suction on the conduit 15 will be transmitted through the conduit 21 to one pair of the teat cups connected with the cow being milked, and thus an inflow of milk will be produced through the conduit 21 into the section 28. When the suction pump 12 is reversed air will be discharged through the conduit 15, thus producing pressure within the section 28. This will relieve the valve 33 so that it will move away from the opening 26. The milk within the chamber 26 will tend to float the valve and lift it out of contact with the lower edge of the opening. Thus the weight of the milk within the section, and the exhaust pressure from the pump, unite to open the valve and force the milk positively from the milk chamber. The pair of cups connected with the conduit 21 will not be disengaged from the cow's udder by the air pressure produced by the reverse action of the pump, for the reason that all of the cups are connected with one another, and at the time that pressure is present in the chamber 28, suction is being exerted upon the cups connected with the conduit 22 and thus the entire set is held in position. As previously stated, at the time milk is being discharged from the section 28, suction is being applied through the conduit 22 to the section 27, so that the suction in this section assists in shifting the valve from the position shown by the broken line 34, to the position shown by the broken line 35, thus closing the opening 25, and the operation takes place through the section 27 in the same way as that described in connection with section 28, except that the two operations alternate with one another.

In the form shown in Fig. 3, the cover plate 24 carries a pipe T 36 into which the sections 37 and 38 of the milker head are fitted, the sections being provided with flanges 39 and 40 respectively which bear against the opposite ends of the pipe T 36. The sections are secured to the pipe T by couplings 41 in a well-known manner. This constitutes a structural arrangement which is easily manufactured and which is readily separated for cleaning and other purposes. Each section of the milker head is provided with a milk inlet 42 and an air connection 43, which are connected with the cow and the air pump respectively, in a manner similar to that described in connection with Fig. 2. A ball valve 44 is held between seats 45 in the ends of the milker head sections and is operated by the air pump in a manner similar to that described in connection with the valve in Fig. 2.

The construction shown in Figs. 4, 5 and 6 is similar to that in Fig. 3 except that the ball valve 44 is replaced by a pair of flap valves 46 and 47 which cover the ends of the milker head sections 37 and 38 respectively. The valves 46 and 47 are preferably made of rubber or similar material and have integrally formed pintles 49 at their upper ends, which fit into recesses 50 provided for that purpose in the ends of the milker head sections 37 and 38. The valves are free to swing away from the ends of the milker head sections to permit discharge of milk into the central portion of the milker head, as shown in broken lines in Fig. 4. In operation, the alternate exhaust and compression produced upon the milker head sections will alternately open and close the valves 46 and 47, one valve being closed while the other is open to discharge milk into the container. In other respects the operation of this form of the invention is similar to that of the other two forms.

I claim:

1. In combination, a milker head having a pair of milk chambers therein provided with oppositely disposed discharge openings, and a ball valve for alternately closing said openings, said openings being spaced relative to one another so that said valve is supported adjacent said openings by contact with a portion of the peripheries thereof.

2. In combination, a milker head having a pair of milk chambers therein, each provided with a milk inlet, an air passage and a milk discharge outlet, and a single ball valve for controlling the milk outlets of the two chambers.

3. In a milking machine, a milker head comprising a pair of chambers having openings disposed oppositely to one another, a ball valve interposed between said openings, and means for alternately exhausting air from said chambers to cause said valve to alternately close said openings.

4. In combination, a milker head comprising a central tubular member, detachable sections each having a milk inlet and an air passage communicating therewith, said sections being connected with the opposite ends of said member, valve means for closing the passages from said sections to said member, and pipe unions for holding said sections and member together and said valve means in place adjacent the openings of said passages.

5. In combination, a milker head comprising a central section, a plurality of milk chambers detachably connected with said central section, and valve means for separately closing said chambers.

6. In combination, a milker head comprising a central section having an opening therein for discharging milk therefrom, a plurality of milk chambers connected with said central section, each chamber having a milk inlet and an air connection, and valve mechanism for alternately closing the openings between said chambers and said central section.

In testimony whereof I have signed my name to this specification on this 29th day of Sep., A. D. 1917.

WILLIAM R. NICOLL.

Witnesses:
 CARL K. BENNETT,
 JOSE APERSON.